United States Patent [19]

Sharaby

[11] Patent Number: 4,871,801

[45] Date of Patent: Oct. 3, 1989

[54] REACTIVE POLYVINYL CHLORIDE AND POLYMER PRODUCTS MADE THEREFROM

[75] Inventor: Zaev Sharaby, South Euclid, Ohio

[73] Assignee: The B. F. Goodrich Company, Akron, Ohio

[21] Appl. No.: 276,175

[22] Filed: Nov. 25, 1988

[51] Int. Cl.$^4$ ............................................. C08F 8/00
[52] U.S. Cl. ..................................... 525/69; 525/66; 525/100; 525/114; 525/129; 525/176; 525/207; 525/213; 525/231
[58] Field of Search ................... 525/66, 69, 100, 114, 525/129, 176, 207, 213, 231

[56] References Cited

U.S. PATENT DOCUMENTS

| | | | |
|---|---|---|---|
| 3,825,622 | 7/1974 | Robeson et al. | 525/69 |
| 3,855,357 | 12/1974 | Harris et al. | 525/69 |
| 4,382,128 | 5/1983 | Li | 525/30 |
| 4,506,056 | 3/1985 | Gaylord | 525/67 |
| 4,732,934 | 3/1988 | Hathaway et al. | 525/67 |
| 4,791,189 | 12/1988 | Yu | 528/355 |

*Primary Examiner*—Morton Foelak
*Attorney, Agent, or Firm*—Thoburn T. Dunlap

[57] ABSTRACT

Thermoplastic polymers exhibiting improved physical properties and a method for preparing same are described. The method of preparing these polymer compositions comprises reacting a functionalized base polymer composition having pendant cyclic anhydride groups with a coreactive second moiety. Said functionalized base polymer comprises the reaction product of:

I. a hydroxyl containing base polymer comprising the reaction product of:
   (a) a vinyl halide monomer; and
   (b) at least one other ethylenically unsaturated monomer having at least one pendant hydroxyl functional group; and
II. a cyclic polyanhydride functionalizing agent.

10 Claims, No Drawings

REACTIVE POLYVINYL CHLORIDE AND POLYMER PRODUCTS MADE THEREFROM

BACKGROUND OF THE INVENTION

1. Technical Field

This invention relates to polymers containing reactive functional groups and to products obtained therefrom. This invention also relates to a method for appending cyclic polyanhydride groups to vinyl halide polymers by reacting a mixture of hydroxyl functionalized polyvinyl halide and a cyclic polyanhydride functionalizing agent. These functional copolymers are useful in the formation of a wide variety of polymer systems having a variety of physical and chemical properties that may be tailored to specific end uses.

2. State of the Art

Polyvinyl halide resins particularly polyvinyl chloride (PVC) resins have enjoyed a great deal of success as a material which may be formed into a wide variety of useful articles. The ease at which PVC can be molded, extruded, calendered or formed as well as its low cost, has contributed to this success.

PVC by itself is a tough and hard polymer. To enable it to be processed into useful articles, it has been proposed to add to the PVC processing aids, such as plasticizers and lubricants, or to form blends with other monomeric and/or polymeric compounding ingredients. Processing aids are normally incorporated into PVC during what is normally called a compounding operation. The PVC is worked on mill rolls and the processing aid(s) is added and milled into the polymer. This mixing can also be performed with internal mixers or other mixing equipment all of which is known in the art. PVC compositions made with processing aids perform very well in most applications. However, these compositions have a tendency to migrate out of the PVC over extended periods of time. This migration phenomenon can lead to problems in some products. For instance, PVC will become more brittle as the plasticizer migrates out, thus leading to cracking and loss of flexibility of the PVC article. In certain medical and food applications such as, for example, blood bags, medical tubing, food wrap and beverage containers, migrating processing aids may be extracted by the contents of the container leading to contamination.

In another approach to the processing problem, it has been proposed to prepare blends of polymers which maximizes the processing and/or physical properties of the component polymers. However, these attempts have generally been unsuccessful. Blends of different types of polymers are often incompatible, resulting in a marked deterioration or loss of physical properties characteristic of each of the unblended polymers. The polymers tend to become cheesy during processing, making it extremely difficult to disperse any desired additives uniformly throughout the blend. Even where the two polymer components are compatible during melt processing, they often tend to separate into segregated domains of individual polymer components.

Because of these drawbacks, various attempts have been undertaken to prepare polymer compositions that are easily processable and which possess improved physical properties. In this regard, many methods have focused upon the preparation and use of functionalized polymers having pendant reactive groups which facilitate the grafting of materials and other polymers to form graft-modified polymers and polymer blends having improved physical properties. The preparation of graft-modified resins by grafting carboxyl-functionalities to a substrate polymer via the reaction of an anhydride and a polymer reactive therewith is known. It is also known that the carboxyl-functionalized polymers thusly obtained may subsequently be further modified with compounds containing free hydroxyl groups. However, the prior art is directed to methods of forming carboxyl-containing polymers and products obtained thereby and not to polymers containing pendant cyclic anhydride groups.

U.S. Pat. No. 4,382,128 discloses a method for preparing carboxyl-modified polyolefins comprising the steps of: (1) reacting a thermally degraded polyolefin with an unsaturated polycarboxylic acid, ester or anhydride which is graft polymerizable therewith; and (2) reacting the carboxyl-functionalized polymer thusly obtained with a polyhydroxy compound to obtain compositions having improved heat distortion, strength and flexual modulus. The reaction of the polyhydroxy compound with the carboxyl-functionalized polymer is preferably conducted in the presence of solvents.

U.S. Pat. No. 4,506,056 discloses a method for preparing carboxyl-containing polymers comprising mixing together maleic anhydride, a free radical copolymerization initiator, an additive which inhibits the homopolymerization of maleic anhydride and a substrate polymer. The ingredients are mixed above the melting point of the substrate polymer in a suitable mixing device yielding a carboxyl-functionalized polymer. Suitable substrate polymers include vinyl halide, e.g., vinyl chloride.

In U.S. Pat. No. 4,680,361 there is disclosed a cross-linked polymer coating composition comprising carboxyl-functionalized lactone acrylates. These compositions are derived from a reactive monomer unit prepared from the reaction of hydroxyalkyl acrylate and epsilon-caprolactone, said monomer unit is subsequently reacted with an anhydride to produce a monomer containing carboxyl groups. The monomer so prepared can be homopolymerized or copolymerized with other ethylenically unsaturated monomers, including vinyl halide.

Basically, however, all of the foregoing methods have disadvantages. Reacting a carboxyl-functionalized substrate polymer with a polyhydroxy compound in the presence of a solvent as disclosed in U.S. Pat. No. 4,382,128 is disadvantageous from the standpoint that solvents are generally difficult to handle, pose environmental hazards and are difficult to dispose of. The melt processable carboxyl-functionalized polymers disclosed in U.S. Pat. No. 4,506,056 require the addition of free radical initiators and certain polymerization inhibitors during their preparation, leading to complex formulation problems. Moreover, the carboxyl-functionalized polymers thusly obtained would be difficult to derivatize with hydroxy containing materials due to the nature of the transesterification reaction. Transesterification is an equilibrium reaction. To shift the equilibrium in the direction favoring products, it would be necessary to utilize large excesses of the hydroxy containing compound or to remove products from the reaction medium. This would require extra process steps and added operation costs.

the disadvantage inherent in the method taught in U.S. Pat. No. 4,680,361are the multitude of reaction products contained in the polymer composition. For example, this patent is directed to crosslinked compositions comprising polymerizing one or more ethylenically unsaturated monomers with a composition comprising:

(a) 0 to 10 weight percent, preferably 0 to 5 weight percent of a lactone;

(b) 0 to about 10 weight percent of hydroxethyl acrylate or methacrylate;

(c) 0 to about 2 weight percent, preferably 1 or less weight percent, of one or more diacrylates;

(d) 0 to about 10 weight percent, preferably 5 or less weight percent, of products resulting from Michael addition, acrylate polymerization, transesterification reactions, or other side reactions;

(e) 0 to about 50 weight percent, preferably 0 to about 20 weight percent, of a reactive monomer of the following average formula:

wherein $R^5$ is a divalent radical, $R^2$ is either hydrogen or methyl, each of $R^3$ and $R^4$ is hydrogen, phenyl, or lower alkyl having 1 to about 6 carbon atoms, x is an integer having a value of up to about 10, and y is an integer having a value up to about 20;

(f) 0 to 20 weight percent, preferably less than 10 weight percent, of the reaction product of hydroxyethyl acrylate or methacrylate and an anhydride; and (g) remainder to 100 weight percent of a reactive monomer of the following average formula:

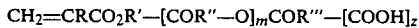

wherein R is H, methyl or ethyl, R' is an alkylene radical having 2 to about 12 carbons, R" is an alkylene radical having about 1 to about 10 carbons, R''' is a divalent radical having 2 to about 20 carbons, m is an integer having a value of 1 to about 20, preferably 1 to about 10, most preferably 1 to 5, and z is an integer having a value of 1 to about 4, preferably 1 to 2.

It is readily apparent from the foregoing that many competing side reactions may occur during the homo- or copolymerization of the above reactive monomer composition. For example, unwanted crosslinking may occur during the homo- or copolymerization of the reactive monomer composition in the presence of the diacrylates as disclosed under item (c) above.

Accordingly, it would be highly desirable to provide a method for preparing a polymer resin which is substantially pure and free from polymerization contaminants and which has improved physical properties by means of an improved process which can be run in a single reaction vessel. None of the foregoing disclosures teach or suggest such a method or polymer product obtained thereby.

SUMMARY OF THE INVENTION

In one aspect of the present invention there is provided a reactive vinyl halide base polymer composition which is functionalized with a cyclic anhydride functionalizing agent.

In another aspect of the invention the functionalized base polymer composition is reacted with a coreactive second moiety wherein a covalent bond(s) is formed between the functionalized base polymer and the coreactive second moiety. Said coreactive second moiety being selected to enhance the processability and physical properties of the resulting composition.

In a further aspect of the invention there is provided a hydroxyl functional vinyl halide polymer than can be reacted with coreactive monomeric and polymeric moieties resulting in a polymer compoosition with improved physical properties.

In a still further aspect of the invention there is provided a functionalized base polymer composition which may be crosslinked without further modification.

In another aspect of the present invention there is provided a polymer composition having internally bound plasticizers, lubricants or impact modifiers.

In another aspect of the present invention there is provided a method for forming compatible blends of polymers and the products obtained thereby.

A still further aspect of this invention is a method of preparing a polymer composition which is free of competing side reactions.

These and other aspects of the present invention are accomplished herein by a method and composition comprising the reaction product of:

I. a hydroxyl containing base polymer comprising the reaction product of:
(a) a vinyl halide monomer; and
(b) at least one other ethylenically unsaturated monomer having at least one pendant hydroxyl group; and II. a cyclic polyanhydride functionalizing agent to give a functionalized base polymer; and III. reacting said functionalized base polymer with a second moiety coreactive therewith, wherein the second coreactive moiety is covalently bonded to the functionalized base polymer.

DETAILED DESCRIPTION

The present invention is directed to a method for functionalizing a hydroxyl or epoxy containing vinyl halide base polymer with a cyclic polyanhydride and to the reaction products thereof that are useful in the formation of a wide variety of polymer compositions.

For ease of definition the hydroxy containing base polymers and monomers as used herein and throughout the claims include epoxy-containing base polymers and monomers.

The compositions of the present invention comprise the reaction products of a functionalized base polymer and a coreactive second moiety. The functionalized base polymer is a vinyl halide polymer having appended cyclic anhydride groups which is obtained from the reaction of a hydroxyl containing vinyl halide copolymer and a cyclic polyanhydride functionalizing agent. The second reactive moiety contains at least one coreactive group capable of forming covalent bonds with cyclic anhydrides, such as, for example, hydroxyl, oxazoline epoxy groups, lactam and secondary amine groups, e.g., —NH—, and the like. The second reactive moiety may be monomeric or polymeric and the term as used herein refers to coreactive plasticizers, lubricants, impact modifiers, heat distortion modifiers, processing aids and polymers or any other physical property modifier or processing aid utilized to improve the physical characteristics and/or processability of the base polymer.

The cyclic anhydride groups are present on the base polymer in a coupling amount, e.g., an amount which is sufficient to coreact with and covalently bond a plasticizing, lubricating, impact modifying or improved processing amount of the second reactive moiety. Of course, as is apparent to those skilled in the art, the amount of cyclic polyanhydride functionality that is required to bind effective amounts of the second reactive moiety will depend somewhat on the particular polymers and modifying aids employed, e.g., their miscibilities with the base polymer, the level of coreactive moiety to be bound and the level of coreactive groups on the coreactive moiety. In general, a coupling amount of cyclic anhydride is present when the repeating units of the base polymer containing the appended cyclic anhydride groups (e.g. hydroxyl containing groups) comprise from about 1 to about 49 percent by weight of the base polymer composition and preferably from 1 to 20 percent by weight of the base polymer composition.

As previously indicated, the functionalized base polymers of the present invention are obtained from the reaction product of a hydroxyl containing vinyl halide copolymer and a cyclic polyanhydride. The hydroxyl containing vinyl halide base polymers of the present invention comprise repeating units of vinyl halide and hydroxyl or epoxy containing vinyl components. As used herein, the term vinyl halide includes vinyl chloride and vinylidene halides, such as, for example, vinylidene chloride and any other vinylidene halide having at least one terminal $CH_2=C<$ group. The hydroxyl containing vinyl component includes hydroxayalkyl acrylates and methacrylates such as, for example, hydroxyethyl acrylate, hydroxypropyl methacrylate, hydroxypropyl acrylate, hydroxypropyl methacrylate, hydroxybutyl methacrylate, hydroxybutyl acrylate and 3-chloro-2-hydroxypropyl methacrylate and the like and acrylated caprolactones (e.g., polycaprolactones) having repeating units represented by the following average formula:

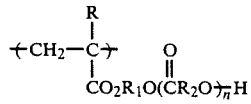

wherein R is hydrogen, lower alkyl, or phenyl, $R_1$ and $R_2$ are, independently, alkylene of 1 to about 8 carbon atoms and n is 1 to about 20. Lower alkyl as used herein refers to branched or straight chain alkyl groups of 1 to 6 carbon atoms. It should be evident to those skilled in the art that n, as used herein, represents an average of the caprolactone molecules per acrylate group. It is also contemplated that fractional values of n between 1 and 20 are within the scope of this invention. The epoxy containing vinyl component includes epoxy acrylates and epoxy methacrylates such as, for example, glycidyl acrylate and glycidyl methacrylate.

The preferred acrylated caprolactone monomers utilized in the present invention may be prepared by the reaction of the appropriate acryloyl chloride, e.g., with diol terminated poly-caprolactones. Methods for preparing acrylated caprolactones are disclosed in copending U.S. patent application Ser. No. 046,818, filed on May 7, 1987 where is hereby incorporated by reference. Other methods for preparing acrylated caprolactones are disclosed in U.S. Pat. No. 4,504,635. The preferred acrylated caprolactone comonomers are those derived from 2-hydroxyethyl acrylate and methacrylate, which may be represented by the following average formula:

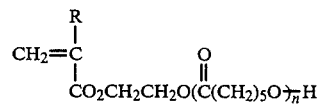

wherein R is methyl or hydrogen and n is 1 to 20.

The preferred acrylated polycaprolactones and non-acrylated polycaprolactone precursors are commercially available from various manufacturers. For example, acrylated and non-acrylated caprolactones are manufactured and sold by Union Carbide Corp. under the TONE ® trademark. Representative formulas are set forth below.

| ACRYLATED AND NON-ACRYLATED POLYCAPROLACTONES | | |
|---|---|---|
| TONE ® Monomer Designation | Approximate No. of Repeating Units (n) | Approximate Molecular Wt. |
| XM-100 | 1 | 230 |
| M-100 | 2 | 340 |
| 0200* | 4–6 | 500 |
| 0240* | 16–18 | 2000 |

*Acrylated monomer was prepared in-house by reacting the appropriate TONE polyol with acryloyl chloride.

The hydroxyl containing vinyl halide base polymer compositions of the present invention are prepared by conventional polymerization techniques in which vinyl halide monomers are copolymerized with hydroxyl containing vinyl comonomers, polymerization catalysts, and if desired, chain transfer agents. The comonomers may be polymerized by any one of a variety of polymerization techniques including mass polymerization, suspension polymerization, or microsuspension polymerization via the polymerization reaction of the ethylenically unsaturated groups of the respective monomers. The preferred process, however, for preparing the base polymers according to this invention is via suspension polymerization. Suspension polymerization techniques are well-known in the art as set forth in the *Encyclopedia of PVC*, pp. 76–85 published by Marcel Decker, Inc. (1976) and need not be discussed in great detail here. Generally, the comonomers are suspension-polymerized in an aqueous medium containing: (1) a suspending agent consisting of one or more water-soluble polymer substances such as polyvinyl alcohol, cellulose ether, partially hydrolyzed polyvinyl acetate, vinyl acetate-maleic anhydride or partially saponified polyalkyl acrylate or gelatine, and (2) a polymerization initiator. Suitable polymerization initiators are selected from the conventional free radical initiators such as organic peroxides and azo compounds. The particular free radical initiator will depend upon the monomeric weight and color requirements of the copolymer and the temperature of the polymerization reaction. Insofar as the amount of initiator employed is concerned, it has been found that an amount in the range of about 0.005 part by weight to about 1.00 part by weight, based on 100 parts by weight of vinyl halide comonomer being polymerized, is satisfactory. It is preferred to employ an amount of initiator in the range of about 0.01 part by weight to about 0.20 part by weight, based on 100 parts by weight of vinyl halide monomer. Examples of suitable initiators include lauroyl peroxide, benzoyl peroxide, acetyl cyclohexyl sulfonyl peroxide, diacetyl peroxide, cumene hydroperoxides, 5-butyl peroxyneodecanoate, alpha-cumyl peroxyneodecanoate, t-butyl cumyl peroxyneodecanoate, t-butyl peroxypivalate, t-butyl peroxyacetate, isopropyldicarbonate, di-n-propyl peroxydicarbonate, disecondary butyl peroxydicarbonate, 2,2'-azobis(2,4-dimethyl valeronitrile), azobisisobutylnitrile, α,α'-azodiisobutyrate and t-butyl perbenzoate, the choice depending on the reaction temperature.

The suspension polymerization process of this invention may be carried out at any temperature which is normal for the copolymer to be polymerized. A temperature range from about 0° C. to about 80° C. is employed. Preferably, a temperature range from about 40° C. to about 70° C. may be employed with a range from about 50° C. to about 60° C. being the most preferable. So far as the temperature is within these ranges, they may be varied in the course of the polymerization. In order to facilitate temperature control during the polymerization process, the reaction medium is kept in contact with cooling surfaces cooled by water, brine, evaporation, etc. This is accomplished by employing a jacketed polymerization reactor wherein the cooling medium is circulated through the jacket throughout the polymerization reaction. This cooling is necessary since most all of the polymerization reactions are exothermic in nature. It is understood of course, that a heating medium may be circulated through the jacket, if necessary.

Lower molecular weight base polymers may optionally be efficiently and effectively produced is one of the preferred advantages of the present invention. By low molecular weight what is meant is that the inherent viscosities of the copolymers of the present invention range from about 0.1 to about 0.7. The inherent viscosity is a representative measure of the molecular weight of a polymer and is obtained in accordance with ASTM procedure No. D-1243-66. It is recognized that the processability of vinyl halide polymers and particularly a vinyl chloride polymer depends to a large extent upon its average degree of polymerization. Polymers having relatively low molecular weights or low inherent viscosities are generally the easiest to fabricate because of their low melt viscosities, low shear sensitivity, good heat stability under high shear, and excellent flow characteristics. Because of these desirable processing characteristics, low molecular weight vinyl chloride type polymers are widely used in applications in which they are injection molded or extruded to form products that may have thin walls, large surface areas, and deep-draw and/or intricate surface detailed parts.

Specifically, the preferred suspension process of this invention utilizes a chain transfer agent (CTA) to produce the low molecular weight base polymers of this invention. Suitable chain transfer agents applicable for this purpose are, for example, saturated hydrocarbons, such as saturated or unsaturated chlorinated hydrocarbons, such as carbon tetrachloride, trichloroethylene and perchloroethylene, aldehydes, such as propionaldehyde and n-butylaldehyde and certain mercapto-containing organic compounds. The most preferred CTA, however, comprises a compsition of: (a) at least one mercaptan chain transfer agent and optionally (b) at least one non-polymerizable material which is miscible with the mercaptan chain transfer agent. Suitable mercaptans for the practice of this invention include water soluble mercaptans such as 2-mercaptoethanol, 3-mercaptopropanol, thiopropyleneglycol, thioglycertine, thioglycolic acid, thiohydracyclic acid, thiolactic acid and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, bis-(2-mercaptoethyl) ether, alkyl mercaptans, and the like. The most preferred mercaptan for use in the present invention is 2-mercaptoethanol (2-ME), however, any chain transfer agent having one or more mercapto (—SH) group(s) would be acceptable.

The chain transfer composition may be pre-mixed with the comonomer to encapsulate the mercaptan chain transfer agent before its introduction into the reactor. Alternatively, the chain transfer agent may be pre-mixed with a non-polymerizable material which is miscible with the chain transfer agent and is substantially insoluble in water. The term non-polymerizable as used herein means that the material does not form a part of the vinyl polymer backbone in the sense that a traditional comonomer would form. The non-polymerizable material may, in some cases, graft polymerize onto the vinyl polymer chain but this is not normally considered a copolymer. The term substantially insoluble in water as used in this specification means that the materials have less than 5% solubility in water. The non-polymerizable material may be a monomer, oligomer or a polymer. Suitable non-polymerizable materials include dioctyl phthalate, low molecular weight poly (caprolactone), polysilicones, esters of glycerols, polyesters, water insoluble esters of fatty acids with —OH terminated polyoxyethylene and polyoxypropylene, esters of polyols, esters of monoacids and polyacids, esters of organic polyphosphates, phenyl ethers, ethoxylated alkylphenols, sorbitan monostearate and sorbitan monooleate and other sorbitol esters of fatty acids. Usually, the chain transfer composition must contain at least an equal amount in weight of non-polymerizable material as chain transfer agent in order to encapsulate or host the chain transfer agent. Preferably, the composition contains at least twice as much weight of non-polymerizable material as chain transfer agent.

The amounts of chain transfer agent employed in the practice of both the comonomer and non-polymerizable material encapsulant embodiments of the present invention range from 0.05 to 2.0 phm by weight per 100 phm of vinyl halide comonomer. Preferably from 0.1 to 1.0 phm by weight per 100 phm of vinyl halide comonomer may be employed. Most preferably 0.1 to 0.8 phm by weight per 100 phm of vinyl halide comonomer may be utilized. The chain transfer agent may be added to the reaction medium before the onset of polymerization or it may be metered in during the course of the polymerization reaction in combination with the comonomer.

The terms "encapsulation", "encapsulate" and "encapsulating" as used herein mean that the CTA is homogeneously mixed with the comonomer or non-polymerizable material.

The preferred polymerization initiators utilized in the process for preparing the low molecular weight copolymers of the present invention are alpha-cumyl peroxyneodecanoate, t-cumyl peroxyneodecanoate, t-butyl peroxypivalate and t-amyl peroxyneodecanoate or combinations thereof. Most preferably, a dual initiator composition comprising alpha-cumyl peroxyneodecanoate and t-butyl peroxypivalate is utilized as the initiator. This initiator system results in a reduced residual initiator level in the final product and a shorter high temperature history due to faster reactions.

The concentration of hydroxyl containing vinyl comonomer in the polymerization medium can range from about 1 to about 49 phm by weight based upon 100 phm by weight of vinyl chloride monomer. The polymerized base polymer contains from about 1 to about 49 percent by weight of hydroxyl containing components. Preferably the polymerized base polymer contains from about 1 to about 20 weight percent of hydroxyl containing components. Typically the hydroxyl content of the base polymer ranges from about 0.1 to about 25 mole percent and preferably from about 0.5 to 15 mole percent. In order to obtain a uniform copolymer (e.g. to randomize the distribution of hydroxyl groups along the copolymer backbone), it is preferable to meet the hydroxyl containing comonomer into the reaction medium during the course of the polymerization. Of course, if a low molecular weight copolymer is desired, the appropriate CTA is utilized in the reaction medium as previously set forth.

The hydroxyl containing vinyl halide base polymers so prepared are functionalized with a cyclic polyanhydride functionalizing agent. The reaction between the base polymer and functionalizing agent occurs under the appropriate conditions to form a functionalized base polymer with appended cyclic anhydride groups. The term polycyclic anhydride as used herein refers to an oganic molecule containing at least two cyclic anhydride reactive groups. At least one cyclic anhydride group of the functionalizing agent is available to coreact with the hydroxyl or epoxy group(s) situated on the base polymer, while the other cyclic anhydride group(s) remains available for further reaction. In other words, such groups serve as attachment vehicles capable of covalently coupling the second reactive moiety to the base polymer. The functionalizing agent may be monomeric or polymeric. Examples of cyclic polyanhydride functionalizing agents useful in the present invention are as follows: 5-(2,5-dioxotetra-hydro-3-furanyl)-3-cyclohexene-1,2, dicarboxylic anhydride (CAS Registry No. 73003-90-4); one tetracarboxylic dianhydride (CAS Registry No. 2421-28-5); 1,2,4,5-benzene-tetracarboxylic anhydride (CAS Registry No. 89-32-7); 3,4,3',4'-biphenyltetracarboxylic dianhydride (CAS Registry 2420-87-3); glycerol acetate bistrimellitate (dianhydride) (CAS Registry No. 1732-97-4); and ethylene glycol bistrimellitate (dianhydride) (CAS Registry No. 1732-96-3). The foregoing polyanhydrides are available from commercial suppliers such as, for example, the Chriskev Company, Inc. of Leawood, Kansas.

It should also be understood that polymeric cyclic polyanhydrides including copolymeric cyclic polyanhydrides are useful as functionalizing agents in the present invention. Examples of such copolymers which can be successfully employed in this invention include alkyl vinyl ether/maleic anhydride copolymers and styrene/maleic anhydride copolymers. The formula of the copolymeric alkyl vinyl ether is as follows:

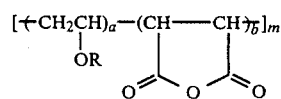

wherein R is lower alkyl, and b independently are integers ranging from 1 to about 100 and m has a value such that the molecular weight of the copolymer is between about 1000 to about 200,000.

Useful styrene/maleic anhydride copolymers are represented as follows:

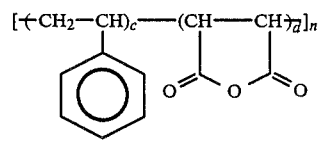

wherein c and d independently are integers ranging from 1 to about 100 and n has a value such that the molecular weight of the copolymer is between about 400 to about 200,000 and preferably from about 1000 to about 50,000. Generally, the maleic anhydride content of the copolymer may range from about 1 to about 50 percent by weight of the total copolymer. Methyl vinyl ether/maleic anhydride copolymers are commercially available from suppliers such as, for example, the GAF Corporation under the trademark GANTREZ ® (AN Series) The sytrene/maleic anhydride copolymers are commercially available from suppliers such as Arco Chemical under the DYLARK ® and SMA 3000A trademarks. Other polymeric functionalizing agents include alkylene/maleic anhydride copolymers, cycloalkylene/maleic anhydride copolymers, maleic anhydride/alkyl acrylate and methacrylate copolymers and maleic anhydride/alkyl acrylamide copolymers and the like.

The sytrene/maleic anhydride copolymers may optionally contain other monomers as well as other polymers. Copolymers of styrene and maleic anhydride can contain monomers such as butadiene and terpolymers such as acrylonitrile/butadiene/styrene. Such terpolymer compositions are commercially available from Monsanto Corporation and Arco Chemical under the trademarks CADON ® 300 series (e.g., 322, 330, 332 and 340) and DYLARK ® 700 respectively. CADON compositions are described in U.S. Pat. No. 4,223,096. DYLARK-700 contains about 83 weight percent sytrene, 7.5 weight percent maleic anhydride and 9.1 weight percent polybutadiene.

Generally, the hydroxyl containing base polymer and the functionalizing agent are brought into contact with each other under intensive shear and elevated temperature conditions to yield the functionalized base polymer. The amount of cyclic polyanhydride needed to functionalize the base polymer will depend, of course, on the amount of hydroxyl functionality present on the base polymer backbone. To fully functionalize the base polymer backbone at least 1:1 molar ratio of functionalizing agent to hydroxyl functionality should be employed. To ensure complete functionalization of the base polymer the functionalizing agent should be employed in slight molar excess. However, lesser amounts of functionalizing agent may be utilized if desired. The functionalized base polymer may then subsequently be reacted under these same conditions with the second reactive moiety to give the final modified polymer product. In practice, the base polymer is functionalized by melt blending the hydroxyl containing vinyl halide copolymer and functionalizing agent in conventional melt blending equipment such as a two-roll mill, Brabender Plasticorder, a single or multiple screw extruder, or any other of the well-known thermal mechanical mixing devices normally used in the mixing, compounding, processing or fabricating of thermoplastic polymers. The hydroxy containing base polymers are functionalized at temperatures between 250° and 350° F. It is important that this reaction be conducted under anhydrous conditions (including the use of anhydrous ingredients) so as not to hydrolyze the cyclic anhydride groups on the polyanhydride functionalizing agent. The functionalized base polymer thusly obtained may then be further modified to desired end product specifications by coreacting it under heat and shear with the desired second reactive moieties, e.g., coreactive plasticizers, lubricants, impact modifiers, processing aids and coreactive polymer blends. In practice, a mixture of base polymer and functionalizing agent (and, if desired, optional additives as set forth below) are mixed at a reaction temperature above the softening point of the base polymer resin (250° to 350°) where the mixture undergoes deformation and is converted to a molten state, e.g., to a fluid or semi-fluid state. Alternatively, the functionalizing agent and desired additives may be added to the molten base polymer. The mixture of reactants is subjected to mechanical deformation in a suitable mixing device such as a Brabender Plasticorder, a two-roll mill, a single or double screw extruder or any other of the well-known mechanical mixing equipment normally utilized in the mixing, compounding, processing or fabricating of thermoplastic polymers. The functionalization reaction is fairly rapid and is completed to a major extent approximately 1 to 5 min. after the ingredients reach the molten state. Coreactive second moieties can then be added to the functionalized base polymer undergoing deformation in the mechanical mixing device. The coreactive second moiety may be added continuously or in several portions over a period of time to promote homogeneous and complete reaction throughout the mixture. The reaction is generally complete approximately 5 min. after the coreactive moiety has been added to the functionalized base polymer.

The coreactive moieties of the present invention are reacted in sufficient amounts whereby substantially all cyclic anhydride groups on the base polymer are reacted to form covalent linkages with the coreactive moiety. The molar ratio of coreactive functional groups on the coreactive second moiety to cyclic anhydride groups on the functionalized base polymer should preferably be 1:1 to ensure complete reaction of the cyclic anhydride groups. As indicated previously, the level of coreactive second moiety to be bound will dictate the level of cyclic polyhydride functionalization of the base polymer and ultimately the level of hydroxyl functionalization to employ in the preparation of the hydroxyl containing vinyl halide base polymer. Accordingly, it is important to employ a base polymer having sufficient levels of functionalization to react with and bind effective amounts of the coreactive second moiety.

The particular type of coreactive moiety to be reacted with the functionalized base polymer will depend upon the desired end use of the composition. Any compound containing a functional group that is coreactive with a cyclic anhydride groups may be utilized so long as the compound produces the desired physical properties. For example, when a composition must exhibit a high degree of plasticization with low migration of plasticizer, polyester plasticizers containing terminal hydroxyl groups must be coreacted with the functionalized base polymers of the invention. The terminal hydroxyl groups on the polyester coreact with the cyclic anhydride groups on the functionalized base polymer forming an internally plasticized, e.g., permanently plasticized, polymer composition. Particularly useful plasticizers are PLASTHALL® P-1070 and ADMEX® 2056, hydroxyl terminated polyesters from the C.P. Hall Company and Nuodex, Inc. respectively, and TONE® caprolactone polyols such as TONE 0240 available from Union Carbide.

Epoxy type materials with and without curing agents may also be utilized in the present invention. Examples of epoxy materials are epoxidized soybean and linseed oils, cycloaliphatic epoxides, such as ERL-4221 by Union Carbide, aliphatic expoxides, such as FL313 by Kishimoto Sangyo Company of Japan, and EPON® epoxy resins by Shell Chemical Company. Suitable epoxy curing agents known in the art of epoxy curing such as, for example, the amine curing agents may be utilized in conjunction with the epoxy resins of the present invention.

Any plasticizer containing free hydroxyl groups or epoxide groups may be utilized so long as the plasticizer is compatible with the base polymer. Suitable levels of coreactive plasticizer to be utilized in the present invention will range from about 1 to about 100 phr and preferably from about 40 to about 80 phr.

When it is desirable to reduce the melt viscosity or increase the processability of the present base polymer compositions, permanently bound lubricants may be incorporated therein. In this way the lubricant will not migrate out of the finished product. In selecting a coreactive lubricant it is important that it be only slightly compatible with the base polymar. Too must compatibility will lead to plasticization of the base polymer resin instead of lubrication and such resin would not be useful where rigid properties are desired. Any lubricant useful in the lubrication of vinyl polymers may be utilized so long as it contains a coreactive functional group. Of particular interest are the fatty alcohol containing lubricants such as, for example, 9,10-dihydroxy stearic acid, 12-hydroxy stearic acid, lithium 12-hydroxy stearate, 1-eicosanol, 1-octadecanol, 1-hexadecanol, 1-tetradecanol, 1-dodecanol, and 2-dodecanol. These lubricants are normally volatile and consequently evaporate under conventional processing conditions in the polymer melt. The method of the present invention is a way to covalently bond such lubricants to the base polymer composition consequently reducing their volatility during processing.

Other lubricants useful in the present invention are the silanol terminated polysiloxanes having the following structure:

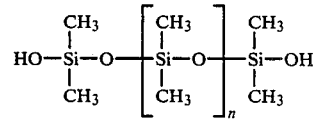

wherein n is 1 to 100

Suitable levels of coreactive lubricant to be utilized in the present invention will range from about 0.1 to 10 phr and preferably from 0.1 to about 5 phr.

Through the method of the present invention impact modifiers may easily be grafted to the functionalized base polymers of the present invention. As is well-known in the polymer art impact modifiers are incompatible or semi-compatible discontinuous domains of rubbery type polymers which are homogeneously dispersed throughout a continuous polymer phase. For optimum performance, the impact modifier must resist the formation of a single phase system with the polymer within which it is dispersed. The impact modifier must also be sufficiently compatible with the polymer to adhere to the polymer at the polymer-impact modifier interface. The coreactive groups on the functionalized base polymer and on the impact modifier serve to provide a compatible interface. Any impact modifier which contains or which can be modified to contain pendant functional groups coreactive with cyclic anhydrides may be utilized herein. Suitable levels of coreactive impact modifiers to be utilized in the present invention will range from about 5 to 50 phr and preferably from 5-30 phr.

Polymer blends comprising the functionalized base polymer of the present invention and a second coreactive polymer may be prepared in accordance with the method of this invention. The second reactive polymer moiety can be one of any thermoplastic polymers which contain or can be modified to contain a coreactive group as hereinbefore described. Polymers such as olefins, vinyl halides, vinylidene halides, acrylic esters and monovinylidene aromatics may be utilized. In order to be useful, the second reactive polymer moiety should generally be a copolymer made up of at least some monomer units which contain a pendant coreactive group. For example, polymers can be copolymerized from a comonomer containing a pendant hydroxyl group such as those previously described. Comonomers containing pendant oxazoline groups such as, for example, 2-alkenyl-2-oxazolines (hereinafter referred to as oxazoline), especially 2-isopropenyl-2-oxazoline are also useful. Such copolymers are described in U.S. Pat. Nos. 3,380,975 and 3,505,297. Reactive polystyrene (M.W. 200,000, specific gravity 1.04) containing 1 percent oxazoline functionality is commercially available from Dow Chemical. Comonomers containing epoxy functionalities such as glycidyl acrylate and methacrylate and the like may also be utilized. Reactive terpolymers such as styrene/acrylonitrile/oxazoline (RSAN) may be employed and are commercially available from Dow Chemical. Polymers containing the secondary amine groups, (e.g. —NH—), such as, for example, various polyurethanes, polyamides, polypeptides and polymers derived from caprolactams, ureaformaldehydes, malmamine-formaldehydes and the like may be utilized in the blends of the present invention. Hydroxyl containing polymers such as hydroxyl containing polystyrene, hydroxyl containing styrene/acrylonitrile copolymer, hydroxyl containing styrene/acrylonitirle/α-methyl styrene terpolymer and hydroxyl containing polyolefins may also be utilized.

The polymer blends of the present invention can be prepared using wide ranges of functionalized base polymer components. By varying the proportion of pendant cyclic anhydride groups on the base polymer and by varying the type and amount of the second polymer moiety, the properties of the resultant blend can be engineered to many desired specifications. The coreactive groups on the functionalized base polymer and second polymer moieties serve to compatibilize the blend of respective components. Of course, the more compatible the respective polymer backbones are, the less the need for compatibilizing coreactive groups. Since, as described in more detail hereinbefore, the cyclic anhydride forms a covalent linkage with the coreactive group on the second polymer moiety, it is readily seen that the degree of compatibilization of the polymer blends can also be controlled with the proportion of cyclic anhydride functional groups present in the blend. As also discussed above, the level of anhydride functionality on the functionalized base polymer ultimately depends upon the hydroxyl level present on the base polymer component.

In another aspect of the present invention, the method described herein can be utilized to provide a crosslinked polymer composition. In this embodiment, the cyclic anhydride funtionalized base polymer can be reacted with any of the hydroxy containing base polymers described herein. Alternatively, the hydroxyl containing base polymers can be mixed on the thermal mixing equipment described hereinabove with the cyclic polyanhydride functionalizing agent. The functionalizing agent in effect functions as a crosslinking agent. Crosslinking may also be utilized to ensure that a coreactive second moiety becomes permanently bound within the polymer matrix. For example, an internally platicized composition can be produced by reacting a hydroxyl containing plasticizer with a functionalized base polymer, herein described, to yield a plasticized base polymer having pendant hydroxyl groups. The plasticized base polymer having pendant hydroxyl groups on the plasticizer moiety can be functionalized with cyclic polyanhydride and subsequently correacted with additional plasticized base polymer having pendant hydroxyl groups to yield a crosslinked, plasticized polymer composition as exemplified in Example 24.

It should be readily apparent from reading and understanding the disclosure herein that any of the hydroxyl containing base polymers of this invention can also be reacted with any cyclic anhydride containing moiety to form desired end products. For example, hydroxy containing vinyl halide base polymers may be reacted with the DYLARK and SMA 3000A styrene/maleic anhydride copolymers as well as impact modified styrene/maleic anhydride terpolymers such as the CADON ® polymers from Monsanto. These terpolymers are described and prepared according to U.S. Pat. No. 4,223,096. Such compositions exhibit improved heat distortion properties. The hydroxyl containing base polymers can also be reacted with maleic anhydride modified ethylene/propylene copolymers which are commercially available from Himont U.S.A. and Exxon under the trademarks, PRO-FAX ® SB222PM and VISTALON ® XX1601, respectively.

In addition to the internally bound plasticizers, lubricants, processing aids and polymer blends, etc., the compositions of the present invention may also contain optional compounding ingredients which are conventional in the preparation of compound resins. Typically, these additives include stabilizers, plasticizers, lubricants, processing aids and the like which are well known in the polymer compounding art and need not be described here.

The following examples will show one skilled in the art how to operate within the scope of the present invention and are not intended to serve as a limitation on the scope of this invention for such scope is defined only in the claims. In these examples, all parts are parts by weight and all percentages are percentages by weight.

EXAMPLES 1-9

To a two-roll mill heated to 280° F. was added 100 parts of a hydroxyl containing base polymer resin (1.2 mole % hydroxyl content) comprising a copolymer of vinyl chloride/acrylated caprolactone (6.3 wt. % TONE M-100). The base polymer was functionalized by adding the cyclic polyanhydride functionalizing agents in the proportions shown in Table 1 and milling for 2 to 4 min. To the functionalized base polymer was added to the various coreactive second moieties also set forth in Table I. The components were milled for an additional 5 to 15 min.

To show that the coreactive second moieties are covalently grafted onto the functionalized base polymer thus giving an internally modified polyvinyl copolymer (e.g., the coreactive second moiety cannot be totally extracted out of the resin), a 1 to 2 gram sample of each polymer blend was pressed into a thin sheet 30 mils thick by 3 inches in diameter. Each sample was immersed in 75 g of n-butyl chloride for 24 hrs., removed and then dried in a vacuum oven at 60° C. for 24 hrs. and weighed. The amount of extracted second moiety was calculated by comparing the weight loss of the extracted sample to the original weight of the sample before extraction. The results are given in Table I.

lubricant processing aids were added to the resin mixture before milling. The hydroxyl containing base polymer (3.2 wt. % TONE M-100) had a 0.6 mole % hydroxyl content. The I.V. of the resin was 0.46.

The compositions were qualitatively rated for processability on the mill during the 3 min. period following the addition of the coreactive second moiety. Due to crosslinking, excessive processing increases melt viscosities leading to hard processing. Processability was rated as very soft, soft and hard (soft being the most desirable and hard being the least desirable). Heat distortion temperature (HDT) of 1/8 in. thick bars were evaluated for each example in accordance with ASTM D-648. (Samples annealed 90° C. for 24 hrs.)

The results set forth in Table II indicate that the compositions of the present invention have improved processability over PVC homopolymer while maintaining good heat distortion properties.

TABLE I

| Example | Functionalizing Agent Type | Level (phr) | Coreactive Moiety Type | Level (phr) | Percent of Extractable (less) Coreactive Moiety |
|---|---|---|---|---|---|
| 1 | EPICLON[1] B-4400 | 6.7 | TONE 0240[3] | 50.0 | 2.1 |
| 2 | EPICLON B-4400 | 6.7 | TONE 0240 | 55.3 | 0 |
| 3 | AC-32[2] | 6.7 | TONE 0240 | 55.3 | 37 |
| 4 | EPICLON B-4400 | 6.7 | ESO | 50.0 | 0 |
| 5 | AC-32 | 6.7 | ESO | 63.0 | 23.0 |
| 6 | EPICLON B-4400 | 6.7 | PLASTHALL P-1070 | 50.0 | 41.0 |
| 7 | EPICLON B-4400 | 12.0 | PDMS PS339.7[4] | 33.3 | 0[5] |
| 8 | EPICLON B-4400 | 7.5 | ADMEX 2056 | 60.0 | |
| 9 | CONTROL[6] | — | TONE 0240 | 55.5 | 67.8 |
| 9A | CONTROL[6,7] | — | TONE 0240 | 55.5 | 76.3 |

[1]Trademark of Dainippon Ink & Chemicals (5-(2,5-dioxotetrahydro-3-cyclohexene-1,2-dicarboxylic anhydride)
[2]Glycerol acetate bistrimellitate (dianhydride)
[3]Non-acrylated
[4]Silanol terminated polysiloxane M.W. 400–700 (Petrarch Systems, Inc.)
[5]Weight gain of 4.9%
[6]GEON 110x450 PVC homopolymer (I.V. = .95)
[7]Non reactive due to lack of functionalizing agent

TABLE II

| Example | Functionalizing Agent Type | Level (phr) | Coreactive Moiety Type | Level (phr) | Processability | HDT(°C.) |
|---|---|---|---|---|---|---|
| 10 | — | — | CADON 330[4] | 34 | Soft | 65.0 |
| 11 | — | — | CADON 332[5] | 34 | Soft | 65.0 |
| 12 | SMA 3000A[1] | 34 | — | — | Very Soft | 69.5 |
| 13 | SMA 3000A | 10 | RSAN[6] | 25 | Soft | 69.0 |
| 14 | AC-32 | 5.8 | RSAN | 25 | Soft | 70.5 |
| 15 | AC-32 | 6.0 | EPON 1002F[7] | 20 | Very Soft | 68.5 |
| CONTROL | hydroxyl containing base polymer[2] | | | | Soft | 63.0 |
| CONTROL | PVC homopolymer[3] | | | — | Hard | 69.0 |

[1]Styrene/maleic anhydride copolymer (Acid No. 275) Arco Chemical
[2]0.6 mole % hydroxyl content
[3]GEON 110X377 resin (I.V. = 0.53), BFGoodrich
[4]Impact Modified Styrene/maleic anhydride copolymer, Monsanto Corp.
[5]Styrene/maleic anhydride copolymer, Monsanto Corp.
[6]Styrene/acrylonitrile/oxazoline terpolymer (1 wt. % oxazoline content)
[7]2,2-bis(p-glycidyloxyphenyl) propane condensation product with 2,2-bis(p-hydroxyphenyl) propane, Shell Chemical

EXAMPLES 10–15

These examples illustrate that the grafting of the coreactive second moiety can be effected through the coreaction of the hydroxyl containing base polymer and an anhydride containing second moiety as well as through a functionalized base polymer.

The compositions were prepared as set forth in examples 1–8 except that the mill temperature was 300° F. Conventional tin stabilizer and oxidized polyethylene

EXAMPLES 16–22

The compositions of the following examples were prepared and evaluated as described in examples 10–15 except that the hydroxyl content of the base polymer was about 1 mole % (1.8 wt. % 2-hydroxyethyl acrylate) with an I.V. of 0.45. The compositions were made with conventional processing aids and stabilizers and milled at 320° F. Results are given in Table III.

TABLE III

| Example | Functionalizing Agent Type | Level (phr) | Coreactive Moiety Type | Level (phr) | Processability | HDT(°C.) |
|---|---|---|---|---|---|---|
| 16 | EPICLON B-4400 | 12.0 | EPON 1002F | 40.0 | Very Soft | 76.5 |
| 17 | EPICLON B-4000 | 12.0 | EPON 1002F | 80.0 | Very Soft | 76.0 |
| 18 | — | — | DYLARK 290 | 23.3 | Soft | 69.5 |
| 19 | — | — | DYLARK 290 | 66.7 | Soft | 75.0 |
| 20 | — | — | RSAN | 70.0 | Soft | 71.5 |
| 21 | SMA 3000A | 16.7 | RSAN | 70.0 | Soft | 77.5 |
| 22 | SMA 3000A | 9.3 | RSAN | 70.0 | Soft | 77.5 |
| CONTROL | hydroxyl containing base polymer[1] | | | | Soft | 63.0 |

[1]1.0 mole % hydroxyl content

EXAMPLE 23

To a two-roll mill was added 100 parts of a base polymer containing 2.17 mole percent hydroxyl content (10.8 wt. $ TONE M-100) and the amounts of functionalizing agent indicated in Table IV. The ingredients were milled t 300° F. for 5 min. to obtain a functionalized base polymer. 70 phr of polymeric plasticizer (TONE 0240) was then added to the functionalized base polymer composition and milled for an additional 14 min. The internally plasticized composition was then evaluated for extractables and compression set properties in accordance with examples 1-8 and ASTM D395-61, respectively. Results are shown in Table IV.

EXAMPLE 24

125 g. of the plasticized polymer composition of Example 23 was additionally functionalized with the functionalizing agent set forth in Table IV. The functionalizing reaction was carried out on a two-roll mill at 300° F. for 4 min. To the functionalized plasticized composition was then added 125 additional grams of the compound of Example 23. The ingredients were milled for an additional 4 min. Following the milling there was obtained a crosslinked internally plasticized polymer composition. The composition was evaluated as in Example 23. Results were given in Table IV.

additional 5 min. The polymer blend was pressed into a sheet and specimans were taken in accordance with the various tests set forth in Table V.

TABLE V

| | 25 | 26 | 27 | Control[1] |
|---|---|---|---|---|
| Base Polymer/Polyurethane Ratio | 60/40 | 50/50 | 40/60 | 50/50 |
| Brittleness temp. (°C.) (ASTM D-746) | −51 | −56 | −55.5 | −60.5 |
| Tear Resistance (lbs/in) (ASTM D-1004) | 728 | 625(±19) | 537 | 512(±5) |
| Tensile at Break (psi) (ASTM D-412) | 4084 | 3449 | 2881 | 2687 |
| Elongation (%) (ASTM D-412) | 172 | 182 | 220 | 106 |
| 100% Modulus (psi) (ASTM D-412) | 3528 | 2956 | 2315 | 2667 |
| Yield Stress (psi) (ASTM D-412) | 4099 | 3457 | 2887 | 2613 |
| Yield Strain (%) (ASTM-D412) | 174 | 182 | 217 | 106 |
| Oil Resistance (% vol.) (ASTM D-2683) | +12.05 | +13.20 | +14.51 | +15.04 |

[1]Base polymer was not functionalized with cyclic polyanhydride.

EXAMPLES 28–34

Two different base polymers were prepared from vinyl chloride which was copolymerized with acrylated caprolactone or 2-hydroxyethyl acrylate (2-HEA). The acrylated caprolactone base polymer contained approximately 6.0 wt. % TONE M-100 acrylated caprolactone and had a 1.1 mole % hydroxyl content. The 2-hydroxyethyl acrylate base polymer contained 6.8 wt. % 2-HEA and had a hydroxyl content of 3.8 mole %. The base polymers were functionalized with the agents set forth in Table VI. The coreactive second moiety was a polycaprolactone diol of 2000 M.W. which is commercially available from Union Carbide Corporation and sold under the TONE 2241 trademark. The base polymers were functionalized and derivatized with the coreactive second moiety in accordance with the procedures set forth in examples 10-15. Tin stabilizer and oxidized polyethylene lubricant were added in the amount of 2 phr and 0.15 phr, respectively.

TABLE IV

| Example | Functionalizing Agent Type | Level (phr) | % of Extractable (loss) Plasticizer | Compression Set % |
|---|---|---|---|---|
| 23 | EPICLON B-4400 | 11.75 | 26.0 | 58 |
| 24 | EPICLON B-4400 | 5 | 5.3 | 59 |
| CONTROL[1] | — | — | 87 | 70–78[2] |

[1]GEON 110X450 PVC homopolymer (I.V. = .95) plasticized with 110 phr TONE 0240
[2]Typical range for PVC homopolymer compositions with polymeric plasticizer

EXAMPLES 25–27

Polymer blends were prepared utilizing the functionalized base polymers of the present invention and a coreactive polyurethane, e.g. ESTANE® 5714, a polyether urethane available from the B.F. Goodrich Company. To a two roll mill heated to 300° F. was added 100 parts of a hydroxyl containing base polymer resin (2.5 mole % hydroxyl content) comprising a vinyl chloride/2-hydroxyethyl acrylate copolymer (4.5 wt. % 2-HEA), 9.3 to 13.0 phr of a cyclic polyanhydride (EPICLON B-4400, wt. % was kept constant relative to total wt. of the composition) and 3.0 phr of tin stabilizer. The ingredients were milled for 2 to 5 min. to allow functionalization to take place. To the functionalized base polymer was then added the coreactive polyurethane in the ratios indicated in Table V and milled for an

TABLE VI

| | Examples | | | | | | |
|---|---|---|---|---|---|---|---|
| | 28 | 29 | 30 | 31 | 32 | 33 | 34 |
| Functionalizing Agent | EPICLON | SMA3000A | AC-32 | — | EPICLON | AC-32 | — |
| Level (phr) | 7.5 | 22.5 | 14 | — | 16 | 30 | — |
| Comonomer | TONE M-100 | TONE M-100 | TONE M-100 | TONE M-100 | 2-HEA | 2-HEA | 2-HEA |
| 100% Modulus (psi) | 2136 | — | 2654 | 1317 | 860 | 957 | 930 |
| Elongation (%) | 186 | 40 | 165 | 277 | 135 | 108 | 239 |
| Tensile (psi) | 2927 | 2453 | 3421 | 2005 | 1229 | 1039 | 1200 |
| Abrasion (mg) | 178.7 | 184.2 | 169.0 | 89 | 108.6 | 149.9 | 333.2 |
| Hardness Shore A/D | 89/54 | 92/57 | 92/53 | 86/37 | 60/23 | 64/23 | 88/38 |
| Oil Resistance (% Vol. Change) | +11.77 | +10.14 | +8.71 | +13.15 | — | — | — |
| Brittleness Temp (°C.) | −17.0 | 0 | −11.5 | −19.5 | −18.5 | −12.9 | −11.5 |

What is claimed is:

1. A graft copolymer composition comprising the reaction product of:
   I. a hydroxyl containing base polymer comprising the reaction product of
      (a) a vinyl halide monomer; and
      (b) at least one other ethylenically unsaturated monomer having at least one pendant hydroxyl functional group; and
   II. a cyclic polyanhydride functionalizing agent, the grafting occurring by the reaction between the hydroxyl groups on the base polymer and a cyclic anhydride group(s) on the functionalizing agent, wherein said functionalizing agent after grafting onto the base polymer has free cyclic anhydride group(s) available for further reaction; and
   III. a coreactive second moiety containing at least one group which is capable of reacting with said free pendant cyclic anhydride group(s) forming a covalent linkage between said base polymer and said coreactive second moiety, wherein said coreactive second moiety is selected from the group consisting of hydroxyl terminated polyesters, caprolactone polyols, silanol terminated polydimethysiloxanes, reactive polystyrene, reactive styrene/acrylonitrile/oxazoline terpolymers, epoxidized soybean oil, epoxidized linseed oil, cycloaliphatic epoxides, aliphatic epoxides, 2,2-bis(p-glycidyloxyphenyl) propane condensation product with 2,2-bis(p-hydroxyphenyl) propane, hydroxyl containing polystyrene, hydroxyl containing styrene/acrylonitrile copolymer, hydroxyl containing styrene/acrylonitrile/alpha-methylstyrene terpolymer, hydroxyl containing plasticizers, coreactive lubricants, coreactive impact modifiers, —NH— group containing polymers, coreactive polymers of vinyl halides, acrylic esters, polyolefins, vinylidene aromatics, wherein each polymer contains pendant hydroxyl, oxazoline or epoxy functionalities.

2. The base polymer composition of claim 1, wherein component (a) is vinyl chloride and component (b) is selected from the group consisting of hydroxyalkyl acrylates, hydroxyalkyl methacrylates, and acrylated caprolactones, glycidyl acrylates and glycidyl methacrylate and mixtures thereof.

3. The base polymer composition of claim 2, wherein the acrylated caprolactone is represented by the following average formula:

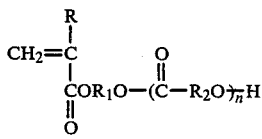

wherein R is hydrogen, lower alkyl or phenyl, $R_1$ and $R_2$ are independently alkylene of 1 to about 8 carbon atoms and n is 1 to 20.

4. The base polymer composition of claim 3, wherein R is hydrogen, $R_1$ is ethylene, $R_2$ is pentylene and n is 1 to 20.

5. The base polymer composition of claim 2, wherein component (b) is present in the amount of about 1 to 49 percent by weight of the base polymer composition.

6. The base polymer composition of claim 2, wherein the hydroxyl content ranges from about 0.1 to about 25 mole percent.

7. The base polymer composition of claim 2, wherein component (b) is present in the amount of about 1 to 20 percent by weight of the base polymer composition.

8. The base polymer composition of claim 2, wherein the hydroxyl content ranges from about 0.5 to about 15 mole percent.

9. The graft copolymer composition of claim 1, wherein the functionalizing agent is selected from the group consisting of 3,3',4,4'-benzophenone tetracarboxylic dianhydride; 1,2,4,5-benzene-tetracarboxylic anhydride; 3,4,3',4'-biphenyltetracarboxylic dianhydride; 5-(2,5-dioxotetrahydro-3-furanyl)-3-cyclohexene-1,2-dicarboxylic anhydride; 5-isobenzofurancarboxylic acid, 1,3-dihydro-1,3-dioxo-1,2-ethanediyl ester; 5-isobenzofurancarboxylic acid, 1,2-dihydro-1,3-dioxo-1,2-ethanediyl ester; 5-isobenzofurancarboxylic acid, 1,3-dihydro-1,3-dioxo-,2-(acetyloxy)-1,3-propanediyl ester; styrene/maleic anhydride copolymer; vinyl ether/maleic anhydride copolymer; alkylene/maleic anhydride copolymers; cycloalkylene/maleic anhydride copolymers; maleic anhydride/alkyl acrylate and methacrylate copolymers; maleic anhydride/acrylamide copolymer.

10. The —NH— group containing coreactive second moiety of claim 1, selected from the group consisting of polyurethanes, polyamides, polypeptides and polymers derived from caprolactams, ureaformaldehydes, and melamineformaldehydes.

* * * * *